United States Patent [19]

Muhlberger et al.

[11] Patent Number: 4,878,295

[45] Date of Patent: Nov. 7, 1989

[54] METHOD AND APPARATUS FOR ATTACHING CONNECTORS

[75] Inventors: Michael A. Muhlberger, Hillsborough, N.J.; Willard E. Rapp, Lantana, Fla.

[73] Assignee: American Telephone and Telegraph Company, New York, N.Y.

[21] Appl. No.: 290,551

[22] Filed: Dec. 27, 1988

[51] Int. Cl.[4] ........................ H01R 43/04; B23P 19/00

[52] U.S. Cl. ........................................ 29/863; 29/749; 29/866

[58] Field of Search ................. 29/746, 749, 861, 753, 29/709, 863, 866

[56] References Cited

U.S. PATENT DOCUMENTS

| | | | |
|---|---|---|---|
| 3,967,356 | 7/1976 | Holt | 29/709 X |
| 4,014,087 | 3/1977 | Cover et al. | 29/721 |
| 4,034,472 | 7/1977 | Cover et al. | 29/749 |
| 4,238,874 | 12/1980 | Chandler et al. | 29/749 X |
| 4,434,551 | 3/1984 | Holt | 29/861 |
| 4,517,718 | 5/1985 | Johnson, Jr. | 29/749 X |
| 4,642,874 | 2/1987 | Litehizer, Jr. | 29/749 X |
| 4,718,167 | 1/1988 | Moore et al. | 29/746 X |

*Primary Examiner*—Howard N. Goldberg
*Assistant Examiner*—Carl J. Arbes
*Attorney, Agent, or Firm*—Robert B. Levy

[57] ABSTRACT

An appartus (10) attaching successive pairs of wires (12) to successive pairs of opposed contacts (15) of a connector (16) comprises a connector-carrying carriage (44,46) mounted for movement along a longitudinal axis. Each of a pair of ram assemblies (100) is mounted on opposite sides of the carriage for movement to and from a separate one of a pair of opposed contacts on the connector. Each pair of wire guides (58) is situated adjacent to a separate one of the ram assemblies for guiding a wire pulled thereacross into alignment with one of a pair the opposed connector contacts. Once each wire is aligned with the connector contact, each ram assembly is actuated to attach the wire to the contact. After wire attachment, an advancing mechanism (120, 126, 134, 142, 146) advances the carriage so that each of a successive pair of contacts is opposite a separate one of the ram assemblies.

9 Claims, 7 Drawing Sheets

FIG. 2A
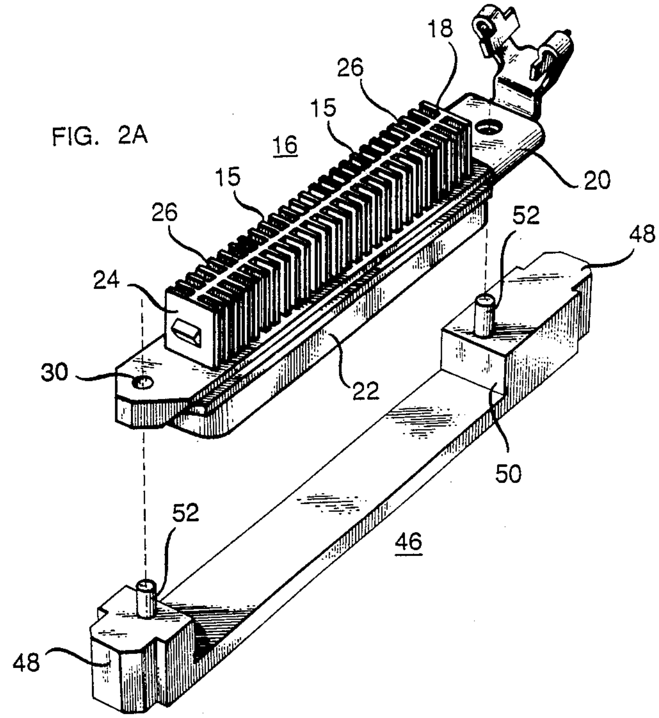
FIG. 2
FIG. 2B
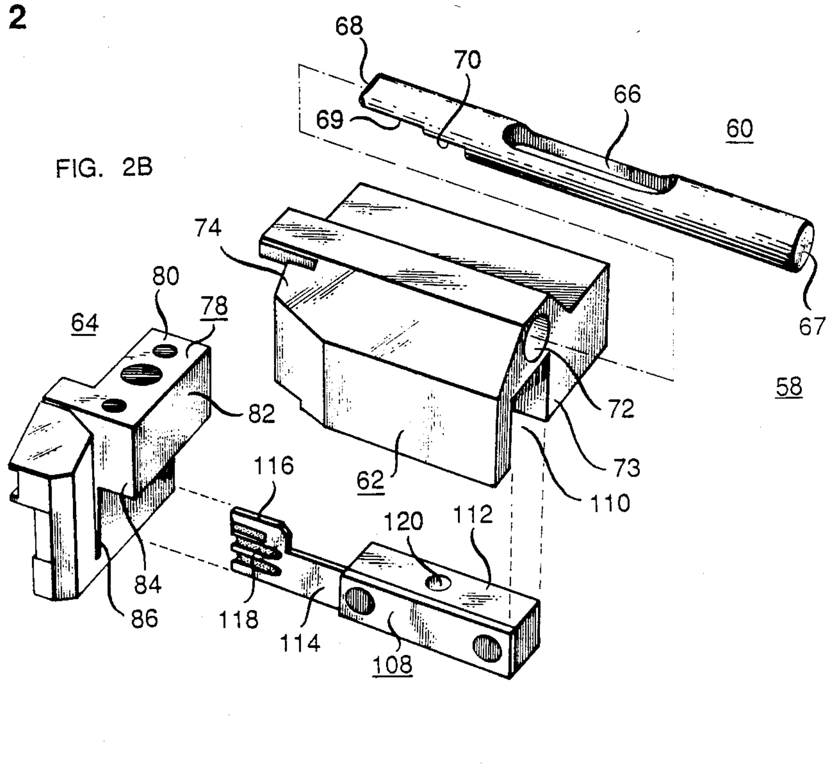

METHOD AND APPARATUS FOR ATTACHING CONNECTORS

TECHNICAL FIELD

This invention relates to technique for attaching successive pairs of wires in a cable to successive pairs of contacts of an electrical connector.

BACKGROUND OF THE INVENTION

Often, two pieces of telecommunication equipment are interconnected by one or more multi-conductor cables. To facilitate such interconnection, a connector is provided at each end of each cable for mating with a corresponding jack on each piece of equipment. One type of connector that is widely used within the telecommunication industry is the "ribbon" connector, which is comprised of a prismatically shaped, insulative block which carries two longitudinal rows of opposed, spaced-apart electrical contacts. Each contact has a mating portion at one end which is exposed through the block for mating with a complementary contact of the jack in the piece of equipment.

Opposite the mating portion of each contact is a terminating portion, which is exposed through a separate one of a plurality of recesses, each located along a separate one of the longitudinal sides of the connector block. The terminating portion of each contact is provided with at least one barb for piercing the insulation of a wire in the cable when the wire is rammed into the recess. Once the barb has completely pierced the insulation on the wire, an electrical connection is made between the wire and the contact.

Usually, attachment of each wire in the cable to each corresponding contact of a connector occurs at the facility where the cable is manufactured. At such facilities, a machine of the type disclosed in U.S. Pat. No. 4,034,472, issued on July 12, 1977, in the name of William S. Cover et al., may be employed to attach successive pairs of wires to successive pairs of contacts on the connector in a semi-automatic fashion. While the connector attachment apparatus disclosed in the Cover et al. '472 patent generally operates satisfactorily, the apparatus is nonetheless very bulky and mechanically complex. For these reasons, the Cover et al. apparatus is ill-suited for use in the field where there is often the need attach a connector to a cable, such as after a factory-installed connector is removed and the cable is then shortened.

Presently, field attachment of a ribbon connector to a cable is carried out manually. First, an operator clamps the connector in a jig and then aligns the proper wire adjacent with the first recess. The operator then rams the wire into the recess so the barb on the contact pierces the insulation surrounding the wire. The process of aligning the appropriate wire with each successsive recess on each side on the connector block is repeated until all the wires are attached to their corresponding contacts.

Manual attachment of the wires to their corresponding contact incurs several difficulties. First, the process is tedious, especially when the connector has a large number of contacts, as is often the case. Further alignment of each wire with the corresponding recess sometimes requires the operator to use both hands, making it difficult to then ram the wire into the recess.

Thus, there is a need for a simple device which can be used in the field for attaching successive pairs of wires in a cable to successive pairs of contacts of the connector in a semiautomatic fashion without the foregoing difficulties.

SUMMARY OF THE INVENTION

Briefly, in accordance with a preferred embodiment of the invention, an apparatus is provided for attaching successive pairs of wires to successive pairs of opposed connector contacts, each contact seated in a separate recess lying in a separate one of a pair of rows on opposite sides on the connector. The apparatus of the invention comprises a connector-carrying carriage slidably mounted on a base for movement along a longitudinal axis. Each of a pair of rams is slidably mounted on the base for movement to and from a separate one of a pair of opposed contacts on a connector carried by the carriage. Each of a pair of wire guides is mounted to the base adjacent to a separate one of the rams. The wire guides each include a stationary catch for releasably holding a wire in a first orientation when the wire is pulled onto the catch by an operator. A flat surface is situated adjacent to the catch on each wire guide to allow the free end of the non-caught wire to be pulled thereacross by the operator into alignment with one of the rams. Each of a pair of actuating means serves to displace a separate one of the rams towards the contact opposite thereto to attach the aligned wire with the contact. A carriage-advancing mechanism is coupled to one of the actuating means to advance the carriage in a first direction along the longitudinal axis so that each of a successive pair of contacts is now aligned with a separate one of the rams, and each just-attached wire is released from its catch.

BRIEF DESCRIPTION OF THE DRAWING

FIG. 2a is an enlarged perspective view of the connector of FIG. 1 and a nest on the apparatus of FIG. 1 for engaging the connector;

FIG. 2b shows an exploded view of a portion of a wire guide and a ram comprising part of the apparatus of FIG. 1;

FIG. 5 is a perspective view of another portion of the apparatus of FIG. 1 showing some of the details of a mechanism for advancing a carriage which carries the nest of FIG. 2a;

DETAILED DESCRIPTION

Figure 1:
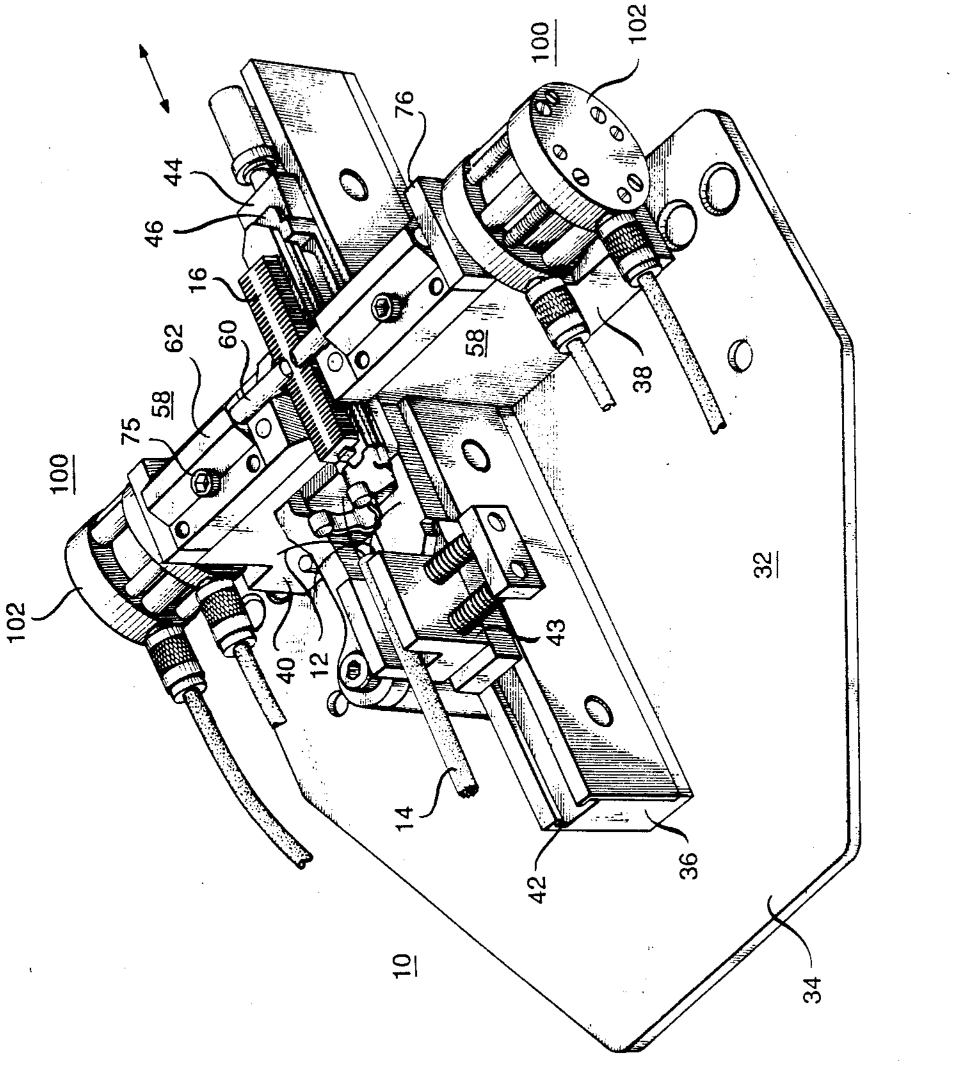
FIG. 1 is a perspective view of an apparatus, in accordance with the invention, for attaching successive pairs of wires to successive pairs of contacts of a connector.

FIG. 1 is a perspective view of an apparatus 10 for attaching (i.e., clinching) successive pairs of wires 12 in a cable 14 to successive pairs of contacts 15 (see FIG. *2a*) of a "ribbon"-type connector 16. In order to appreciate the construction and operation of the apparatus 10, a basic knowledge of the construction of the connector 16, which is known in the art, will prove helpful. As best seen in FIG. *2a*, the connector 16 is comprised of a prismatically shaped, insulative block 18, made from plastic or the like. The block 18 extends through an opening in a metal plate 20 such that a first and second portion 22 and 24 of the block lie below and above, respectively, the plate. The second portion 24 of the block 18 is provided with a plurality of opposed vertical recesses 26 spaced along each of its longitudinal sides. Each recess 26 seats a separate one of the contacts 15 which extend from the second portion 24 into the first portion 22 of the block 18 for mating with a corresponding contact (not shown) of a jack (not shown).

Each contact 15 of FIG. *2a* has at least one laterally extending, wire-piercing barb (not shown) situated opposite to the opening into the recess 26. The barb on each contact 15 serves to pierce the insulation on one of the wires 12 of FIG. 1 when the wire is aligned with its longitudinal axis parallel with, and opposite to, the recess, and the wire is thereafter rammed against the barb. A cover (not shown) is typically placed over the second portion 24 of the block and is secured to the plate 20 by a pair of screws (not shown), each extending through one of a pair of screw holes 30 in the plate.

Referring to FIG. 1, the apparatus 10 comprises a base 32 which includes a plate 34 that supports the bottom of a long wall 36 and the bottom of each of a pair of somewhat higher elevation, shorter length, cross walls 38 and 40. Each of the cross walls 38 and 40 has one of its ends abutting a separate one of the longitudinal faces of the long wall 36 at a right angle thereto so as to be aligned with the other cross wall. In this way, the long wall 36 and the cross walls 38 and 40 form a "cross."

Running along the upper surface of the long wall 38 is a track 42 to which a clamp 43 is secured for releasably engaging the cable 14. A carriage 44 is slidably mounted to the track 42 for movement therealong to and from the clamp 43. The carriage 44 carries a removable nest 46 which serves to hold the connector 16. Referring to FIG. *2a*, the nest 46 is prismatic in shape and is provided with a tongue 48 at each of ends. In between the tongues 48, there is a cutout 50 sized to accommodate the first portion 22 of the block 18 of the connector 16. Each of a pair of posts 52 rises upwardly from the nest 46 adjacent to a separate one of the edges of the cutout 50. The posts 52 are spaced apart the same distance as the screw holes 30 in the plate 20 of the connector 16 and are sized for receipt in the screw holes when the first portion 22 of the connector block 18 is seated in the cutout 50.

Figure 5:
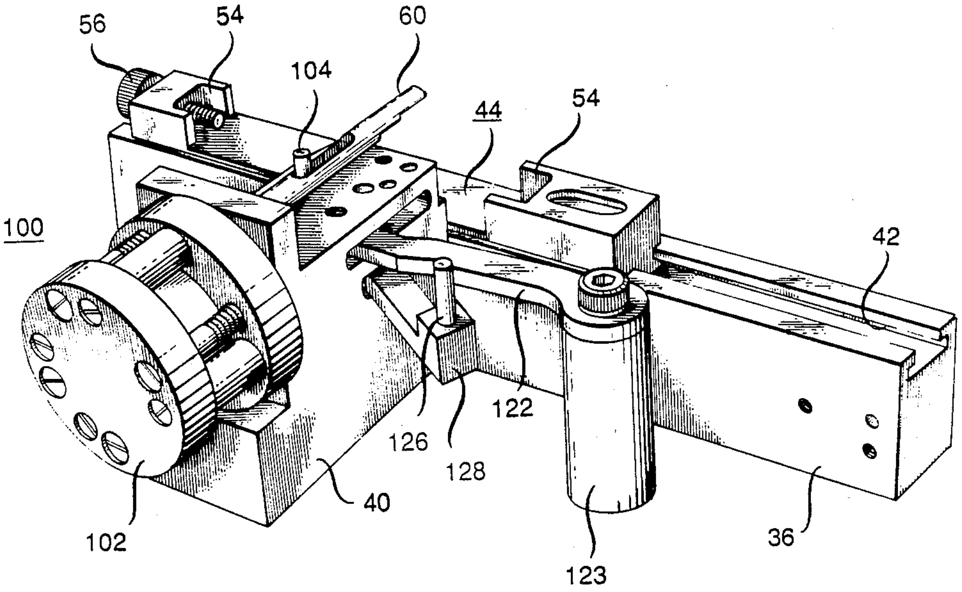
Figure 4:
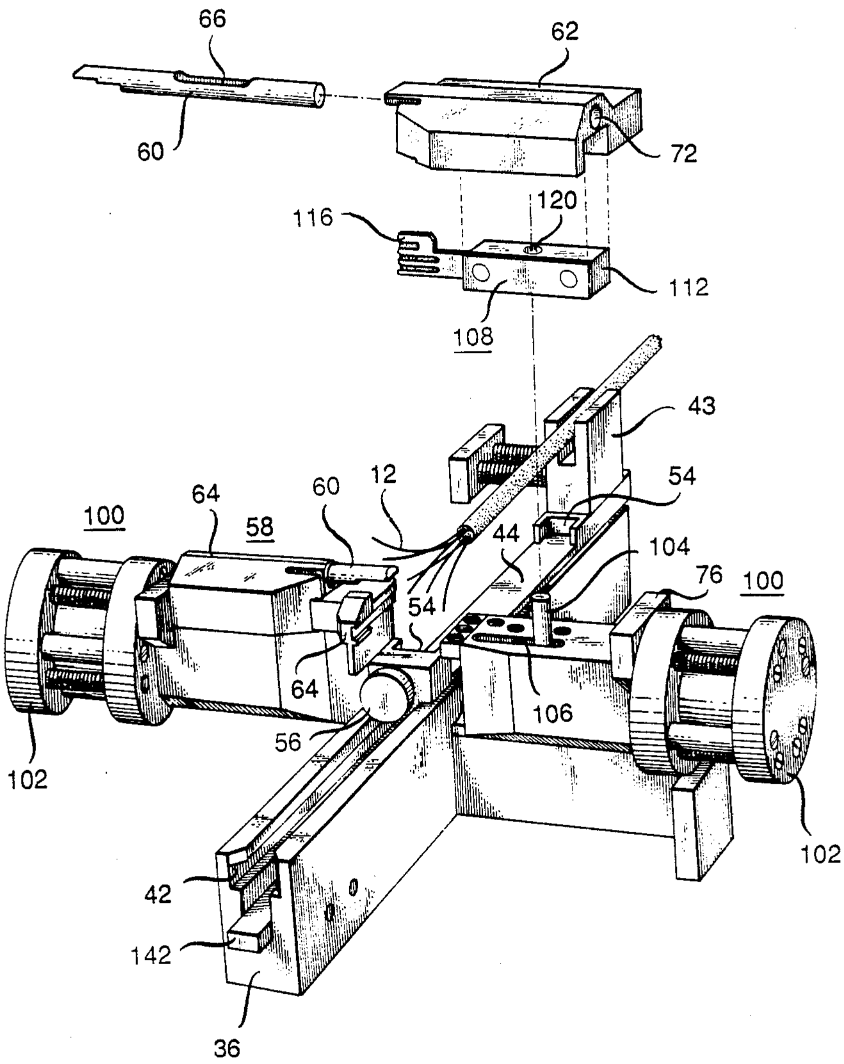
FIG. 4 is a perspective view of a portion of the apparatus of FIG. 1 showing additional details of the wire guide and the ram of FIG. 2b and the ram-actuating mechanism of FIG. 3.
Figure 6:
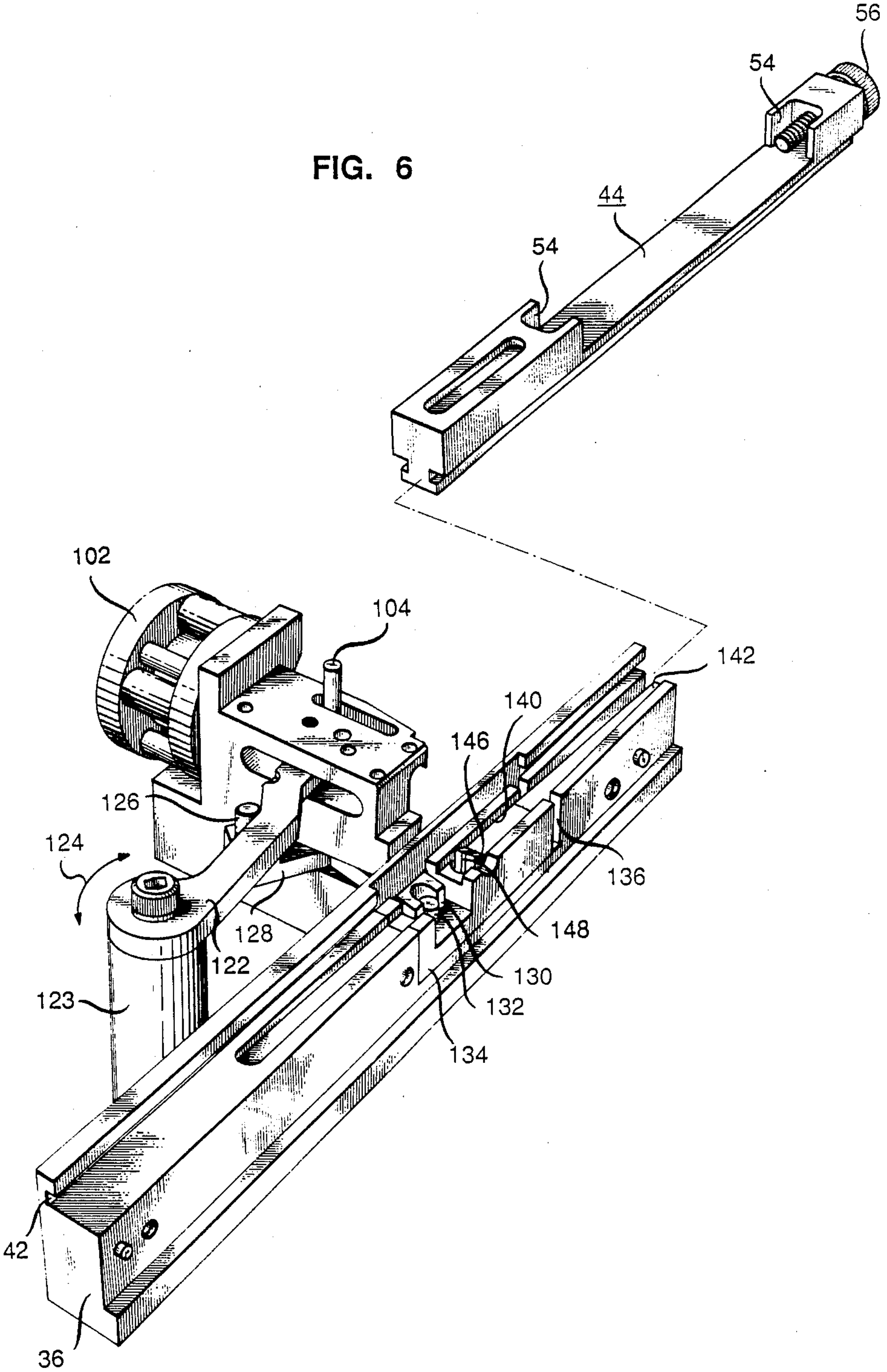
FIG. 6 is a perspective view of another portion of the apparatus of FIG. 1 showing additional details of the carriage-advancing mechanism of FIG. 5.

As may be appreciated, the size of the cutout 50, and the spacing between the posts 52 is specific to particular type of connector 16 to be carried by the nest 46. For this reason, the carriage 44 has been designed so that different nests 46 may be easily interchanged. Referring to FIGS. 4–6, the carriage 44 has a "U"-shaped wall 54 rising upwardly from each of its ends for engaging the tongue 48 (see FIG. *2a*) at each end of the nest 46 of FIG. *2a*. A thumb screw 56 is threaded horizontally into one of the walls 54 on the carriage 44 to bear against the one of the tongues 48 of FIG. *2a* on the nest 46. In this way, the nest 46 is firmly retained in the carriage 44, yet can be easily removed and replaced by a different nest.

Referring to FIG. 1, the upper surface of each of the cross walls 38 and 40 mounts a separate one of a pair of wire guide assemblies 58 which each serve to guide a wire 12, pulled thereacross by an operator, into nominal alignment with one of a pair of opposed recesses 26 in the connector 16. Both of the wire guide assemblies 58 are identical and, therefore, only one will be described. As seen in FIG. *2b*, each wire guide 58 includes a pin 60, a cap 62 and a block 64.

The pin 60 has an elongated opening 66 extending therethrough approximately midway between its rearward (right-hand) end 67, which is ground flat, and its forward (left-hand) end 68. Slightly to the rear (right) of the forward end 68 of the pin 60 are a pair of flats 69 and 70 ground into the periphery of the pin perpendicular to the flat at the rearward end 67. The flat 69, which lies closest to the forward end 68 of the pin 60, is ground deeper than the flat 70 so that a step is present therebetween. At the boundary between the flat 69 and the body of the pin 60, there is also a step.

The pin 60 is received in a passage 72 extending horizontally through the cap 62 between its rearward (right-hand) and forward (left-hand) ends 73 and 74. For proper operation, the pin 60 must be seated in the passage 72 such that its rearward end 67 is flush with the rearward cap end 73 and the flats 69 and 70 are exposed beyond the forward cap end 74 and are oriented face down. Referring to FIG. 1, each cap 62 is secured by a fastener 75 to the top of eachof the cross walls 38 and 40 so the rearward end 73 of the cap abuts a thrust plate 76 rising upwardly from the end of the cross wall distant from the long wall 36. When the cap 62 is mounted in this manner, the thrust plate 76 serve to abut the rearward end 67 of the pin 60.

As described, each wire guide assembly 58 includes the block 64, which, as seen in FIG. 4, is mounted to the top of each separate cross wall 38,40 between the forward end 74 (see FIG. *2b*) of the cap 62 and the long wall 36. Referring to FIG. *2b*, the block 64 has a prismatic shoulder 78 extending horizontally therefrom. It is the shoulder 78 of the block 64 which is actually attached to each cross wall 38,40 of FIG. 1 by means of a bolt (not shown). The shoulder 78 has a top surface 80 for contacting the flat 70 on the pin 60, a side surface 82 which abuts the forward end 74 of the cap 62, and a pair of end surfaces 84, each orthogonal to the side surface. The left-hand one of the end surfaces 84 (the one fully shown in FIG. *2b*), lies immediately to the right of, and at a right angle to, a slot 86 which extends through the block so as to expose one and only one of the recess 26 (see FIG. 1) in the connector 16.

As will be appreciated from a description of the operation of the apparatus 10, the shoulder 78 on the block 64, together with the flat 69 on the pin 60, plays a major role in guiding a wire 12 into alignment with one of the recesses 26 (see FIG. 1) in the connector block 18 of FIG. 1. When the pin 60 is received in the passage 72 in the cap 62, the flat 70 on the pin abuts the top surface 80 of the shoulder 78, leaving a slight gap between the flat 69 and the top surface. This gap between the flat 69 and the top surface 80 acts as a "catch" to engage a wire 12 (see FIG. 1) pulled into it by an operator, and to hold the wire in a first orientation parallel to the top surface.

The free end of the wire 12 engaged by the "catch" can then be pulled downwardly along the left-hand end surface 84 (see FIG. 2*b*) into alignment with the slot 86 to bring the wire into alignment with the recess 26 (see FIG. 2*a*) exposed through the slot.

Referring to FIG. 1, in addition to the wire guide assemblies 58, the apparatus 10 further includes a pair of ram assemblies 100, each mounted to the end of a separate one of the cross walls 38 and 40. As will be described in greater detail below, each ram assembly 100 serves to ram the wire 12, which has been aligned with the slot 86 (see FIG. 2*b*), into the recess 26 of FIG. 2*a* for attachment to the contact 15 of FIG. 2*a*. The ram assemblies 100 are identical, and therefore only the details of the one will be described.

Figure 3:
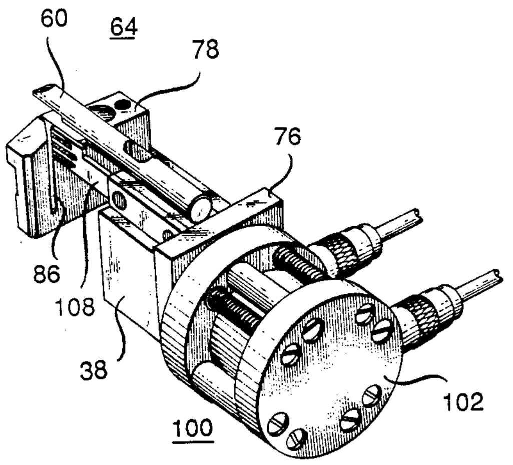
FIG. 3 is a perspective view of a portion of the apparatus of FIG. 1 showing a mechanism for actuating the ram of FIG. 2b.

As best seen in FIGS. 3 and 4, each ram assembly 100 comprises a double-acting pneumatic actuator 102 which is attached to the end of a separate one of the cross walls 38 and 40 in abutment with the thrust plate 76. Referring to FIG. 4, each actuator 102 is mechanically linked to a dowel 104, rising upwardly from an elongated opening 106 in the top surface of the cross wall 38,40. When the actuator 102 is actuated in a forward direction, the dowel 104 is displaced horizontally within the opening 106 towards the long wall 36. Upon actuation of the actuator 102 in a rearward direction, the dowel 104 moves away from the long wall 36. The two actuators 102 are actuated jointly in the forward and rearward direction by pressurized air through an operator-controlled foot pedal vavle (not shown).

Referring to FIG. 2*b*, each ram assembly 100 of FIG. 1 also includes a ram 108 slidably disposed within a passage 110 extending through the cap 62 between its ends 73 and 74 so as to be aligned with the slot 86 when the cap is attached to the top of the cross wall 38,40. The ram assembly 108 is comprised of a prismatic block 112 which mounts the rearward (right-hand) end of a thin blade 114. The forward (left-hand) end of the blade 114 is provided with a head 116, somewhat taller than the remainder of the blade, and sized for insertion through the opening 86 in the block 64.

It is the head 116 of the blade 114 which contacts the wire 12 (see FIG. 1) and forces it through the slot 86 and into the recess 26 (see FIG. 2*a*), aligned with the slot, to attach the wire to the contact 15 (see FIG. 2*a*) exposed through the recess. To keep the wire centered with the head 116 during attachment to the contact 15, a semicircular slot (not shown), of a radius slightly smaller than the diameter of the wire 12, typically runs vertically down a portion the forward (left-hand) edge of the head. As seen in FIG. 2*b*, a set of serrations 118 are ground into the head 116 below this slot to enable the head to sever that portion of the wire 12 depending below the slot 86 when the head is inserted therethrough.

Referring to FIG. 4, the block 112 has a vertical through-passage 120 which receives the dowel 104 when the cap 62, with the ram 108 seated in the cap passage 110, is placed on the top of each cross wall 38,40. As may now be appreciated, the engagement of the block 112 with the dowel 104 enables the ram 108 to move with the dowel. In this way, when each actuator 102 is actuated first in the forward direction and then in the rearward direction, the head 116 on each ram 108 is displaced into and then out of the slot 86 in the block 64 of each corresponding wire guide assembly 58 as seen in FIG. 3.

Referring to FIG. 4, the dowel 104 is of a height sufficient to extend through not only through the block 112 but also part way through the passage 72 in the cap 62 for receipt in the passage 66 in the pin 60. The purpose in having the dowel 104 extend into the passage 66 is to prevent the pin 60 from rotating, which could cause the wire 12 (see FIG. 1) pulled between the flat 69 (FIG. 2*b*) and the surface 80 (FIG. 2*b*) to be pinched. To prevent any interference, the passage 66 in the pin 60 is made at least as long as the horizontal stroke of each dowel 104.

Referring to FIG. 5, the ram assembly 100 carried by the cross wall 40 (FIG. 2), when it displaces its dowel 104 away from the long wall 36, also serves to advance the carriage 44 in a forward (right-hand) direction, as seen in the figure. The forward displacement of the carriage 44 is sufficient to bring a separate one of a successive pair of opposed recesses 26 (see FIG. 2*a*) into alignment with the opening 86 (see FIG. 2*b*) in the block 62 of FIG. 2*b* of each wire guide assembly 58 of FIG. 1. In this way, each of a successive pair of wires 12 of FIG. 1 can then be rammed into each of the newly aligned recesses 26 and thereby attached to the contact 15 (see FIG. 2*a*) in each recess.

Displacement of the carriage 44 by the actuator 102 attached to the cross wall 40 is accomplished in part by an arm 122 which has one end thereof linked to the dowel 104 shown in FIGS. 5 and 6. The arm 122 has its other end rotatably pinned to the top of a vertical post 123. As seen in FIG. 6, when the dowel 104 is displaced towards the long wall 36 by the actuator 102, the arm 122 moves clockwise about a short arc 124. Conversely, when the dowel 104 is displaced away from the long wall 36, the arm 122 moves counterclockwise about the arc 124.

Figure 7:
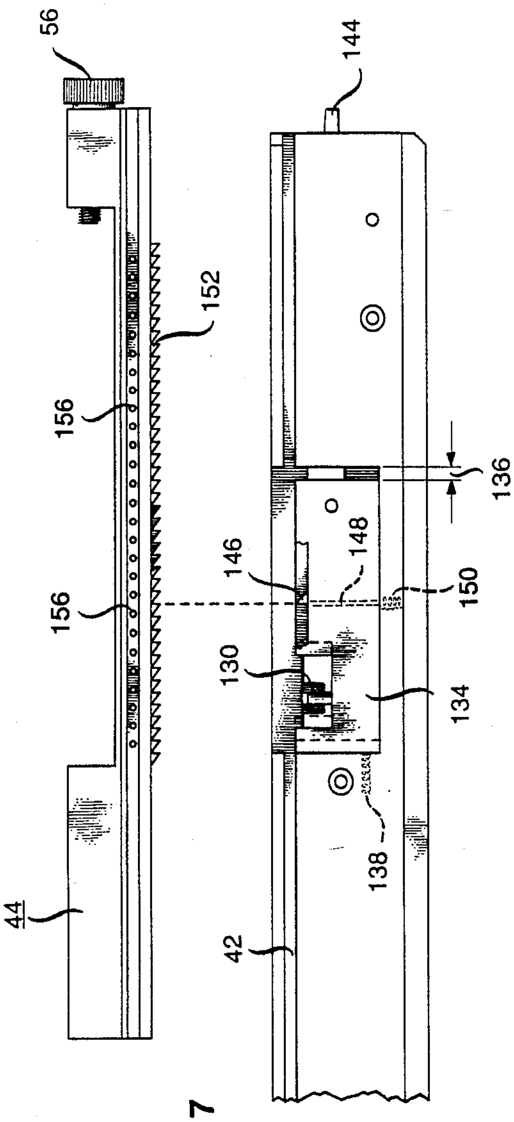
FIG. 7 is a side view of a portion of the apparatus of FIG. 1 showing further details of the carriage-advancing mechanism shown in FIG. 5.

The arm 122 serves as a cam follower for a cam 126 which rises upwardly from one end of an L-shaped lever 128 pinned for rotation at its middle to a point inside the cross wall 40. As best seen in FIG. 6, the end of the lever 128, opposite the one which carries the cam 126, is provided with a yoke 130 which engages a pin 132 carried by a traveler 134 that sits in an opening 136 in the long wall 36. The opening 136 is slightly longer than length of the traveler 134, permitting the traveler to move back and forth within the opening along the axis of the long wall 36. As seen in FIG. 7, a spring 138 is disposed between the forward (left-hand) end of the opening and the traveler 134 to bias the traveler in a rearward (right-hand) direction in that figure.

Referring both to FIGS. 6 and 7, the traveler 134 takes the form of a box-like structure whose upper end is at the same height as the bottom of the track 42 along which the carriage 44 rides. As best seen in FIG. 6, in the top of the traveler 134 is a channel 140 which runs parallel to the long wall 36. The channel 140 accommodates the forward (left-hand) portion of a lever 142 which, as seen in FIG. 8, is journaled by a pin 144 to the traveler 134.

As seen in FIG. 6, the forward (leftward) end of the lever 142 carries a pair of spaced-apart, upstanding teeth 146. Interposed between the teeth is the upper, sloping end of a post 148, which, as seen in FIG. 7, extends down through the traveler 134 into the portion of the long wall 36 therebeneath. A spring 150 is provided within the long wall 36 immediately below the lower end of the post 148 to bias the post upwardly. The post 148 moves vertically but not horizontally, and hence an opening (not shown) of sufficient size is provided in the traveler 134 to permit the traveler to move forwardly and rearwardly within the opening 136 without any interference with the post.

Figure 8:
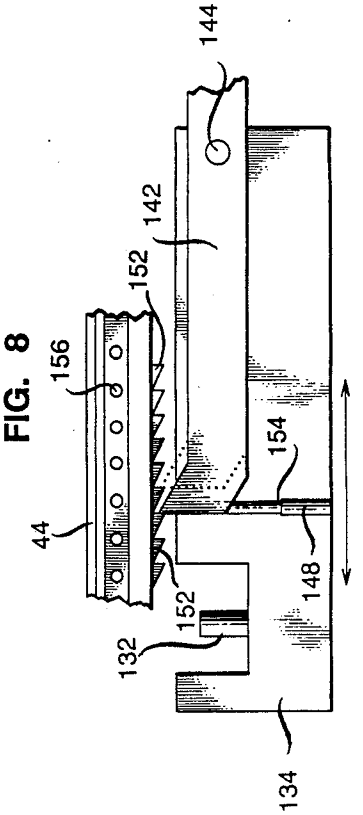
FIG. 8 is a blow-up of a portion of FIG. 7.

As best seen in FIGS. 7 and 8, the teeth 146, together with the upper end of the post 148 interposed therebetween, are sized to engage each of a set of teeth 152 depending from the bottom of the carriage 44. The teeth 152 on the carriage 44 have a center-to-center spacing roughly the same as the center-to-center spacing between the recesses 26 of FIG. *2a*. Thus, when the carriage 44 is displaced along the track 42 by a distance equal to the spacing between a pair of the teeth 152, a successive one of the recesses 26 in each row of FIG. *2a* become exposed through the slot 86 (see FIG. *2b*) in the block 64 of FIG. *2b* of each wire guide assembly 58 of FIG. 1.

To understand how the carriage 44 is advanced along the track 42, reference should now be had to FIG. 6, which depicts the condition when the traveler 134 abuts the forward (left-hand) edge of the opening 136. This condition exists when the actuator 102 of FIG. 6 is actuated in the rearward direction so that the dowel 104 of FIG. 6 is at its rearward position, distant from the long wall 36. As can be seen in FIG. 8, under this condition both the top of the post 148, and the teeth 146 on the lever 144 engage the same one of the teeth 152 on the carriage 44, Referring now to FIG. 6, upon the forward actuation of the actuator 102, the dowel 104 linked to the actuator moves toward the long wall 36. Consequently, the arm 122 now roates in a clockwise direction about the arc 124. The cam 126, which was heretofore constrained by the arm 122, can now ride leftwardly along the arm as the latter rotates. With the cam 126 free to ride along the arm 122, the lever 128 can rotate, allowing the traveler 134 to be biased by the spring 138 of FIG. 7 to its rearward-most (rightward) position to now abut the right-hand edge of the opening 136.

Referring to FIG. 8, since the lever 142 is connected to the traveler 138, as the traveler moves rightwardly, so too does the lever. Once the traveler 134 and the lever 142 have moved to their rightward-most position, the teeth 146 on the lever now engaged the tooth on the carrier 44 immediately to the right of the tooth engaged by the post 148, as indicated by the phantom lines. With the post 148 still engaged with its corresponding tooth 152 on the carriage 44, the carriage remains stationary.

Referring to FIG. 6, when the actuator 102 is actuated in the rearward direction, then the arm 122 rotates counterclockwise, causing the cam 126 to move along the arm in a rightward direction. As a consequence, the lever 128 is rotated in a clockwise direction and urges the traveler 134 to its left-most position. Referring to FIG. 8, as the traveler 134 moves to its left-most position, the lever arm 142 advances the carriage 44 leftwardly by a distance of one tooth. It should be noted that the sloped upper end of the post 148, which serves to engage each of the teeth 152 on the carriage 44 to prevent the rightward motion thereof, will, when the carriage moves leftwardly, slide over each tooth.

Still referring to FIG. 8, when the carriage 44 has been successively advanced in the manner described above, so that the last or rightward-most tooth on the carriage tooth 152 is engaged by the teeth 146 and the top of the post 148, the carriage is then manually moved rearward (rightwardly in FIG. 8) so that the process can be repeated. In order to effect rearward movement of the carriage 44, both the top of the post 148 and the teeth 146 on the lever must be disengaged from the teeth 152 on the carriage. This is accomplished by pivoting the lever 142 in a counterclockwise arc about the pin 144, which causes the teeth 146 to disengage from the teeth 152. When the lever 142 is sufficiently pivoted counterclockwise, the forward (leftward) end of the lever engages a boss 154 on the post 148 to urge the post downwardly against the spring 150 and out of engagement with teeth 152 on the carriage 44.

Referring to FIGS. 7 and 8, a set of uniformly spaced holes 156 is provided in each of the longitudinal sides of the carriage 44. Each of the holes 156 is sized to receive a pin (not shown) linked to a separate one of the rams 108 so as to move in unison therewith. As each ram 108 is displaced towards a separate one of a pair of opposed recesses 26 (see FIG. *2a*), the pin linked to the ram enters a corresponding one of the holes 152 on each side of the carriage 44. In this way, the carriage 44 is locked against movement during attachment of the wire 12 of FIG. 1 to the contact 15 of FIG. *2a*.

Figure 9:
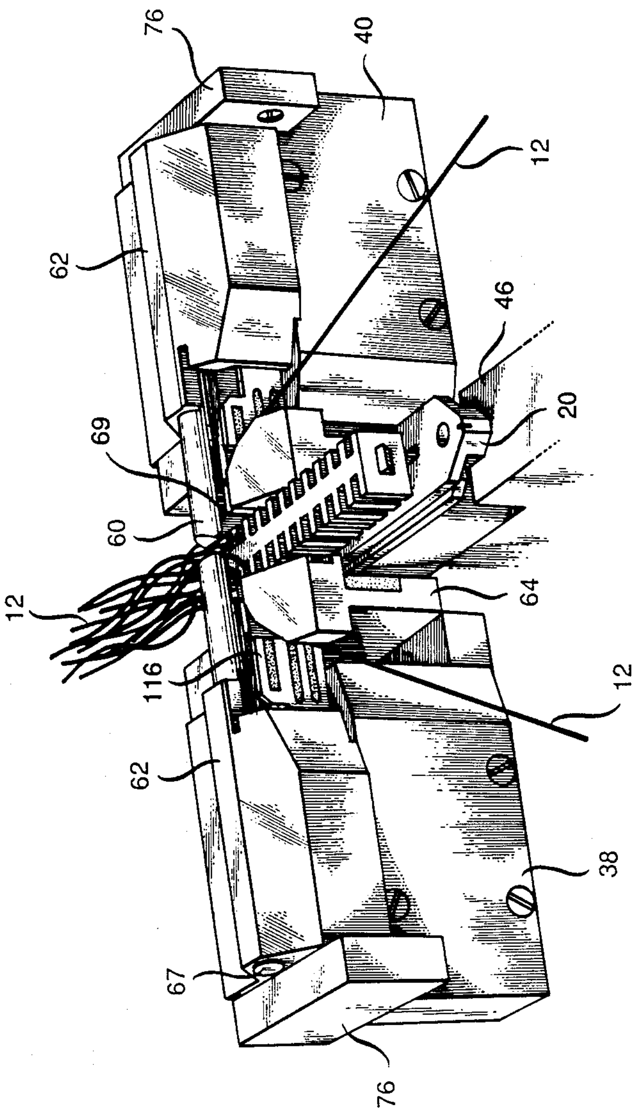
FIG. 9 is a perspective view of a portion of the apparatus of FIG. 1 showing the operation thereof.

The overall operation of the apparatus 10 may best be understood by reference to FIG. 9. To attach each of a pair of wires 12 to each of a pair of opposed contacts 15 in the connector block 18, an operator pulls a separate one of the wires into the catch created between the flat 69 on each pin 60, and the surface 80 on the shoulder 78 (see FIG. *2b*) on each block 64. Thereafter, the operator pulls each wire 12 down along the surface 84 (see FIGS. *2b* and 3) on each block 64 to align the wire with the slot 86 (see FIGS. *2b* and 3). Next, each of the actuators 102 (see FIGS. 3–6) are actuated in the forward direction so the head 116 of each ram 108 (see FIGS. *2b* and 3) rams the wire 12 into the recess 26 for attachment to the contact 15.

Once the wires 12 are attached, the actuators 102 are actuated in the rearward direction to withdraw the head 116 of each ram 108 from the associated recess 26. As will be recalled, upon the backstroke of the actuator carried by the cross wall 40, the connector block 18 carried by the nest 46 is advanced so each of a successive pair of recesses 26 is located opposite a separate one of the rams 108. As the connector block 18 is advanced, each of the wires 12 previously caught between the flat 69 and the surface 80 is pulled therefrom. This procedure is repeated until all of the wires 12 are attached to their corresponding contacts 15. Thereafter, the connector 16 and the cable 12 are disengaged, and then the carriage 44 is manually returned to its rearward position as described previously.

The foregoing discloses an apparatus 10 for attaching successive pairs of wires 12 to successive pairs of contacts 15 of a connector 16.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for successively attaching successive pairs of wires to successive pairs of opposed contacts, each contact lying along a separate one of a pair of rows on a connector, the method comprising the steps of:

placing the connector in a carriage for movement along a first axis such that each of a pair of opposed contacts is opposite a separate one of a pair of rams;

manually pulling each of a pair of wires across each of a pair of wire guides to nominally align each wire with a separate one of the contacts;

manually holding each wire in tension in its respective wire guide while simultaneously displacing each ram towards the contact opposite thereto to attach the aligned wire with the contact;

retracting each of the rams away from the corresponding contact after the wire has been attached thereto; and simultaneously advancing the carriage along the first axis to locate each of a successive pair of contacts opposite a separate one of the rams.

2. The method according to claim 1 wherein the steps of the method are successively repeated until each of a plurality of wires is attached to a separate one of the contacts in each row.

3. The method according to claim 1 wherein the step of manually pulling each of the wires into alignment with a separate one of the contacts comprises the steps of:

pulling each wire into a catch which releasably holds the wire in a first orientation so as to leave a portion of the wire free;

pulling the free portion of the wire across a flat surface to orient the wire orthogonal to the first orientation and in nominal alignment with the contact; and releasing the wire for the catch once the wire is attached to the contact.

4. Apparatus for attaching successive pairs of wires to successive pairs of opposed contacts, each lying along a separate one of a pair of rows on a connector, the apparatus comprising:

a base;

a connector-carrying carriage slidably mounted to the base for movement along a longitudinal axis;

a pair of rams, each slidably mounted to the base for movement to and from a separate one of a pair of opposed contacts on a connector carried by the carriage;

a pair of wire guides, each releasably mounted to the base on opposite sides of the carriage, each wire guide including a stationary catch for releasably engaging a wire, when pulled by an operator into the catch in a first orientation, and a flat surface adjacent to the catch for providing a path along which the wire can be pulled across, and tensioned by, the operator in an orientation perpendicular to the first orientation, to nominally align the wire with a separate one of the rams;

a pair of actuating means, each operatively engaged with a separate one of the rams to displace the ram towards the contact opposite thereto so the ram attaches the wire to the contact and to retract the ram from the contact after the wire is attached; and carriage-advancing means coupled to one of the actuating means for imparting a lateral force to the carriage, only as each ram is retracted from the contact, to advance the carriage in a first direction along the longitudinal axis to pull each wire, which had been previously engaged by the catch, to release the wire therefrom, and to align each of a successive pair of opposed contacts on the connector opposite a separate one of the rams.

5. The apparatus according to claim 4 wherein each of the wire guides comprises:

a block supported by the base and interposed between a separate one of the rams and the carriage, the block having a prismatic shoulder extending laterally therefrom towards the ram, and an opening extending through the block beneath the shoulder for the ram to extend therethrough, the shoulder having a top surface and an end surface, the end surface being adjacent to and perpendicular with the opening for providing the path along which the wire can be pulled by the operator into nominal alignment with the opening;

a pin having a flat ground into the periphery thereof; and means for releasably maintaining the pin against the top of the shoulder so that a gap between exists between the flat on the pin and top surface of the shoulder, the gap serving to catch the wire and releasably hold it in the first orientation.

6. The apparatus according to claim 4 wherein the carriage-advancing means comprises:

a traveler slidably mounted to the base for movement along the longitudinal axis in the first direction and a second direction opposite thereto;

linkage means for coupling the traveler to the one actuating means so that as the actuating means displaced its corresponding ram towards the contact, the traveler is displaced in the second direction, and as the actuating means displaces the ram away from the contact, the traveler is displaced in the first direction;

first means carried by said traveler for engaging the carriage only while the traveler is moving in the first direction; and second means mounted to the base for engaging the carriage to prevent movement thereof in the second direction but allowing movement of the carriage in the first direction.

7. The apparatus according to claim 4 wherein each ram comprises a blade releasably attached to the actuating means for engaging the wire and attaching the wire to the contact opposite.

8. The apparatus according to claim 4 wherein each of actuating means comprises a double acting cylinder.

9. The apparatus according to claim 4 wherein the base comprises:

a flat plate a longitudinal wall rising upwardly from the plate and running along the longitudinal axis;

a track running along the top of the longitudinal wall for receiving the carriage; and a pair of cross walls, each rising upwardly from the plate and running from a separate one of the sides of the long wall in opposite directions along an axis perpendicular to the longitudinal axis, each cross wall mounting a separate one of the wire guides, the rams and the actuating means.

* * * * *